(12) United States Patent
Dong et al.

(10) Patent No.: US 11,420,257 B2
(45) Date of Patent: Aug. 23, 2022

(54) DEVICE AND METHOD FOR HIGH-EFFICIENCY PREPARATION OF SPHERICAL METAL POWDER FOR 3D PRINTING EMPLOYING SEPARATION INTO FIBERS

(71) Applicants: DALIAN UNIVERSITY OF TECHNOLOGY, Liaoning (CN); Xiaoming Wang, Beijing (CN); Sheng Zhu, Beijing (CN); Yang Zhao, Beijing (CN); Wenyu Wang, Beijing (CN); Qing Chang, Beijing (CN); Zhiqiang Ren, Beijing (CN); Guofeng Han, Beijing (CN); Jing Shi, Beijing (CN); Tao Teng, Beijing (CN); Yu Sun, Beijing (CN); Zhiyong Qin, Beijing (CN)

(72) Inventors: Wei Dong, Liaoning (CN); Yao Meng, Liaoning (CN); Sheng Zhu, Beijing (CN); Xiaoming Wang, Beijing (CN); Yang Zhao, Beijing (CN); Yanyang Wang, Liaoning (CN); Fumin Xu, Liaoning (CN); Zhaofeng Bai, Liaoning (CN); Yang Han, Liaoning (CN); Guobin Li, Liaoning (CN); Wenyu Wang, Beijing (CN); Qing Chang, Beijing (CN); Zhiqiang Ren, Beijing (CN); Jing Shi, Beijing (CN); Guofeng Han, Beijing (CN); Tao Teng, Beijing (CN); Yu Sun, Beijing (CN); Zhiyong Qin, Beijing (CN)

(73) Assignees: DALIAN UNIVERSITY OF TECHNOLOGY, Liaoning (CN); Xiaoming Wang, Beijing (CN); Sheng Zhu, Beijing (CN); Yang Zhao, Beijing (CN); Wenyu Wang, Beijing (CN); Qing Chang, Beijing (CN); Zhiqiang Ren, Beijing (CN); Guofeng Han, Beijing (CN); Jing Shi, Beijing (CN); Tao Teng, Beijing (CN); Yu Sun, Beijing (CN); Zhiyong Qin, Beijing (CN)

(*) Notice: Subject to any disclaimer, the term of this patent is extended or adjusted under 35 U.S.C. 154(b) by 0 days.

(21) Appl. No.: 17/280,127

(22) PCT Filed: Sep. 25, 2019

(86) PCT No.: PCT/CN2019/107702
§ 371 (c)(1),
(2) Date: Jun. 29, 2021

(87) PCT Pub. No.: WO2020/063624
PCT Pub. Date: Apr. 2, 2020

(65) Prior Publication Data
US 2022/0001448 A1    Jan. 6, 2022

(30) Foreign Application Priority Data
Sep. 25, 2018   (CN) .......................... 201811117142.0

(51) Int. Cl.
*B22F 9/10* (2006.01)
*B33Y 70/00* (2020.01)

(52) U.S. Cl.
CPC ................ *B22F 9/10* (2013.01); *B33Y 70/00* (2014.12)

(58) Field of Classification Search
None
See application file for complete search history.

(56) References Cited

U.S. PATENT DOCUMENTS 4,323,523 A    4/1982   Ueda et al.
5,259,861 A *  11/1993  Yeh .......................... B22F 9/10
                                                        164/46

(Continued)

FOREIGN PATENT DOCUMENTS

| | | |
|---|---|---|
| CN | 1559696 A | 1/2005 |
| CN | 104588673 A | 5/2015 |

(Continued)

OTHER PUBLICATIONS

Machine translation of CN 104588673 A (originally published May 6, 2015) from Espacenet.*

(Continued)

*Primary Examiner* — George Wyszomierski

(74) *Attorney, Agent, or Firm* — Novick, Kim & Lee, PLLC; Allen Xue

(57) ABSTRACT

An apparatus for efficiently preparing spherical metal powder for 3D printing includes a housing, a crucible and a powder collection area arranged in the housing, wherein a turnplate arranged in the collection area is an inlaid structure. A material having a poor thermal conductivity is selected as the base of the turnplate, and a metal material having a wetting angle less than 90° with respect to droplets is selected and embedded into the base to serve as an atomization plane of the turnplate. An air hole is disposed in the turnplate. The spherical metal powder for 3D printing combines electromagnetic force breaking capillary jet flow and centrifugal atomization, which breaks through the traditional metal split mode, and makes the molten metal in a fibrous splitting.

11 Claims, 2 Drawing Sheets

(56) References Cited

U.S. PATENT DOCUMENTS

| | | | |
|---|---|---|---|
| 2008/0203087 A1* | 8/2008 | Schilling | H05B 6/062 219/600 |
| 2016/0348222 A1* | 12/2016 | Isaac | C22C 38/30 |
| 2021/0308764 A1* | 10/2021 | Wang | B22F 1/0048 |

FOREIGN PATENT DOCUMENTS

| | | |
|---|---|---|
| CN | 107350477 A | 11/2017 |
| CN | 107570721 A | 1/2018 |
| CN | 107775009 A | 3/2018 |
| CN | 109047786 A | 12/2018 |
| JP | 2009062573 A | 3/2009 |
| JP | 2013119663 A | 6/2013 |

OTHER PUBLICATIONS

Machine translation of JP 2009-062573 (originally published Mar. 26, 2009) from Espacenet.*
Machine translation of CN 107350477 A (originally published Nov. 17, 2017) from Espacenet.*

* cited by examiner (a)            (b)

DEVICE AND METHOD FOR HIGH-EFFICIENCY PREPARATION OF SPHERICAL METAL POWDER FOR 3D PRINTING EMPLOYING SEPARATION INTO FIBERS

TECHNICAL FIELD

The present disclosure belongs to the technical field for preparing ultrafine spherical particles, specifically relates to an apparatus and a method for efficiently preparing spherical metal powder for 3D printing employing splitting into fibers, which is a combination of a technology for preparing particles by means of electromagnetic force breaking capillary jet flow and a centrifugal atomization method.

BACKGROUND ART

With the continuous development and innovation of processing technology, spherical powder materials have been widely used in electronic packaging, precision manufacturing, biological materials and other aspects. With the development of 3D printing technology, spherical powder preparation technology is particularly concerned in this aspect. Different from traditional processing technology, 3D printing technology takes metal powder, polymer material and other adhesive materials as raw materials to prepare objects by deposition of successive layers. 3D printing technology has high production efficiency, less waste of raw materials, and can produce workpiece with complex structure. With the rapid development of 3D printing technology, the demand for spherical metal powder for 3D printing is becoming more and more urgent. The spherical powder for 3D printing should have the characteristics of excellent flowability and spreadability, and high sphericity, and should meet the requirements of uniform and controllable size and satellite droplets free, which also limit the development of 3D printing technology.

At present, the main methods of producing spherical metal powder at home and abroad are the atomization method, wire cutting method or punching-remelting method, uniform droplet spray method and so on. The spherical powder prepared by atomization method has wider dispersity and the powder that meets the operating requirements can be obtained only through multiply screenings and detections. The wire cutting method or punching-remelting method is more difficult for materials with poor plasticity, and the prepared spherical particles must be degreased. In the production process of the uniform droplet forming method, the metal jet flow is easily affected by the environment, resulting the produced particles have a certain particle size distribution, and cannot be adjusted and controlled in real time in the production process; in addition, due to the characteristics of high density and low viscosity of the metal, it can only generate film and columnar splitting, and the droplet size is larger. Besides, the atomization method is easy to produce satellite droplets, because of the adhesion of satellite droplets on the powder surface, the flowability and spreadability of the powder will be reduced. Therefore, the powder produced by atomization method cannot meet the requirements.

Therefore, it is necessary to provide a apparatus and a method for preparing ultrafine spherical metal powder with high preparation efficiency and high powder quality to solve the shortcomings in the prior art.

SUMMARY OF THE INVENTION

For the foregoing problems of wider dispersity, ununiform particle size distribution and easy to produce satellite droplets of the spherical particles, the present disclosure provides an apparatus and a method for efficiently preparing spherical metal powder for 3D printing employing splitting into fibers. The present disclosure mainly combines with a method for preparing particles by means of electromagnetic force breaking capillary jet flow and a centrifugal atomization method, and the surface of the disc is heated by induction, so that the molten metal liquid breaks through the traditional split mode, achieving the fibrous split mode which can be implemented only when the atomizing medium is an aqueous or organic solution, thus special spherical metal powder for 3D printing with very small particle size, narrow and controllable particle size, high sphericity, good flowability and spreadability, satellite droplets free, high atomization efficiency, and a very high fine powder yield can be prepared.

The technical solutions adopted by the present disclosure are as follows:

An apparatus for efficiently preparing spherical metal powder for 3D printing employing splitting into fibers, including a housing, a crucible and a powder collection area arranged in the housing; wherein the powder collection area is arranged at the bottom of the housing and the crucible is arranged above the powder collection area. The housing is provided with a crucible air inlet pipe extending into the crucible, and is also provided with a diffusion pump and a mechanical pump connected to the crucible, and is also provided with a cavity air inlet pipe.

The crucible is provided with a thermocouple inside and an induction heater outside. The crucible is provided at the bottom with a nozzle having small holes, and a concentrator is arranged below the nozzle, and an induction coil is arranged outside of the concentrator.

The powder collection area includes a collection tray arranged at the bottom of the housing, and a turnplate arranged above the collection tray and connected with a motor for atomizing metal droplets. The volume of the housing should be large enough for flight and landing range of the droplets after centrifugation and being broken, so as to ensure that the droplets will not solidify on the inner wall of the housing The area of the collection tray should be large enough to collect metal powder.

The turnplate includes a base, an atomization plane and an air hole.

The base is a structure of a "T-shaped" longitudinal section constituted of an upper receiving portion and a lower support portion. The upper surface of the receiving portion is provided with a circular groove with a certain radius coaxial with the center of the receiving portion. The base is made of a material with a thermal conductivity less than 20 W/m/k.

The atomization plane is a disc structure, matching the circular groove of the receiving portion and in interference fitting with the circular groove. The atomization plane is made of a material having a wetting angle less than 90° with respect to uniform droplets.

The air hole is arranged passing through the receiving portion and the support portion. The upper end face of the air hole is in contact with the lower end face of the atomization plane, and the lower end of the air hole is communicated with the outside world.

An induction heating coil is also arranged outside the turnplate.

Preferably, the height of the support portion of the base should not be too high, which should be smaller than the height of the bearing portion. The upper end face of the atomization plane protrudes from an upper end face of the receiving portion with a protrusion height ranging from 0.1 mm to 0.5 mm. The protrusion height should meet the condition that dispersed metal droplets directly fly into the cavity and fall into the collection tray without touching the base. The base is made of a material with thermal conductivity less than 20 W/m/k, such as zirconia ceramic, silica glass or stainless steel. The upper end face of the air hole is less than or equal to the lower end face of the atomization plane. The air hole is provided to pump the gas in the gap of the turnplate more cleanly during vacuumizing, so that the turnplate is safer when rotating at a high speed. Therefore, the larger the contact area between the upper end face of the air hole and the lower end face of the atomization plane, the batter the stability of the atomization plane when vacuumizing.

Further, an aperture of the small hole of the nozzle ranges from 0.02 mm to 2.0 mm.

Further, a wetting angle between a material of the crucible and a molten metal in the crucible is greater than 90°.

Further, a rotational speed of the turnplate ranges from 10000 rpm to 50000 rpm.

Further, a heating thickness of the induction heating coil ranges from 5 mm to 20 mm, and the induction heating coil is connected with a frequency converter and a stabilized voltage supply arranged outside the housing, and a voltage control range of the stabilized voltage supply is 0 v to 50 V.

Further, a center of the turnplate and the nozzle at the bottom of the crucible are coaxial; and the housing in the same horizontal plane with the turnplate is provided with an observation window for photographing by a high-speed camera.

The present disclosure also discloses a method for efficiently preparing spherical metal powder for 3D printing employing splitting into fibers, including the following steps:

S1. charging: sealing the housing after charging the metal material to-be-melted into the crucible arranged in the upper portion of the housing, wherein the crucible is provided at the bottom with the nozzle.

S2. vacuumizing: vacuumizing the crucible and the housing by using the mechanical pump and the diffusion pump, and filling the crucible and the housing with a high-purity inert shielding gas, to make the pressure inside the housing reach a preset value.

S3. heating the crucible: melting the metal material in the crucible using the induction heater, monitoring the temperature inside the crucible in real time by the thermocouple arranged in the crucible, and maintaining the temperature after the metal material is completely melted.

S4. induction heating: enabling the turnplate to rotate at a high preset speed by using the motor, and heating a surface of the turnplate rotating at the high speed to a temperature higher than a melting point of the metal by the induction heating coil.

S5. making the powder: applying a modulating alternating current signal to the induction coil outside the concentrator coaxial with the nozzle arranged in the middle of the housing; introducing into a high-purity inert shielding gas (such as helium, argon gas) into the crucible by using the crucible air inlet pipe arranged on the housing and extending into the crucible, to form a positive pressure difference between the crucible and the housing; the molten metal flowing out from the nozzle to form a capillary jet flow under the action of the pressure difference, and the capillary jet flow breaking into uniform droplets under the action of electromagnetic force applied by the induction coil; the uniform droplets freely landing on the center of the turnplate rotating at a high speed and spreading out, enabling the turnplate to rotate at a preset high speed by the motor, then heating the surface of the turnplate rotating at the high speed above the melting point of the metal material by the induction heating coil; under the action of the centrifugal force, the uniform droplets radially and fibrously splitting to form tiny droplets, and the tiny droplets freely landing and solidifying to form metal powder.

S6. collecting the powder: collecting the metal powder by the collection tray arranged at the bottom of the housing.

Further, a current effective value of the modulation alternating current signal is 30 A to 60 A, a carrier frequency is 3 MHz to 30 Mhz, a modulating frequency is 200 Hz to 20000 Hz, and a duty ratio is 50%.

Further, a heating voltage of the induction heating coil ranges from 0 to 50V, and an induction heating time ranges from 5 to 15 minutes.

Further, a pressure in the housing after vacuuming reaches 0.1 MPa, a holding time after the metal material is completely melted is 15 to 20 minutes. In step S5, a pressure difference generated between the crucible (1) and the housing (16) is 0 to 200 kPa.

Compared with the prior art, the present disclosure has the following advantages:

By combining the technology for preparing particles by means of electromagnetic force breaking capillary jet flow with the centrifugal atomization method, the present disclosure designs an apparatus for efficiently preparing special spherical metal powder for 3D printing in the unique fibrous split mode of solution, which overcomes the disadvantages of high density and low viscosity. The turnplate disclosed in the present disclosure is an inlaid structure, and a material with poor thermal (i.e. a material with a thermal conductivity less than 20 W/m/K) is used as the base, which can effectively reduce the heat transferred to the high-speed motor from the turnplate and prevent from affecting the normal operation of the high-speed motor. The material having good wettability (i.e. having a wetting angle less than 90° with the atomization melt material) is used as the atomization plane, which is conducive to the spread of the droplets on the atomization plane, and thus can make the metal liquid atomization fully.

Under the action of the pressure, the molten metal material in the crucible is sprayed through the nozzle with small holes at the bottom of the crucible to from a capillary jet flow, at the same time, the induction coil generates electromagnetic force which is acted on the capillary jet flow through the concentrator. Under the combined action of the surface tension and electromagnetic force disturbance, the capillary jet flow gradually forms a string of sausage-type droplets, and finally disperses into droplets with the same size and equal spacing. The droplets freely fall to the center of the turnplate rotating at a high speed, due to the effect of induction heating, the uniform droplets will be still in the molten state when they reach to the upper surface of the turnplate. Because the droplet metal has better wettability with the material of the upper surface of the turnplate, the metal droplets can completely spread on the atomization plan without being rebounded. Under the action of centrifugal force, the uniform droplets will spread on the turnplate in a fibrous shape, and split into tiny droplets at the edge of the turnplate to fly out along a fibrous spreading track. The flying droplets freely fall and solidify to form metal powder.

The metal particle produced by electromagnetic force breaking capillary jet flow has uniform particle size, high sphericity and consistent thermal history, but the production of single-orifice preparing particles is not enough to meet the increasing demand By combining the two methods, the productivity rate of the metal powder has been greatly improved. The metal spherical ultrafine powder produced in the present disclosure combines the advantages of the two methods, having uniform particle size, high production efficiency, which can meet the requirements of industrial production.

The method of the present disclosure is highly controllable, which is shown in the following aspects: A heating temperature of the crucible can be accurately controlled by using the induction heater. A pressure difference between the crucible and the housing can be controlled by introducing an inert gas into the crucible and the housing, thereby the speed of the jet flow can be controlled. The size of the small holes of the nozzle arranged at the bottom of the crucible can control the size of the jet flow, so as to control the particle size of the metal particles, thereby the uniform metal spherical ultrafine powder can be obtained, and the production efficiency is high.

In summary, the present disclosure can efficiently prepare metal spherical ultrafine powder with uniform size, high sphericity, consistent thermal history and controllable particle size, having the advantages of high production efficiency, simple structure and low cost, which is suitable for industrial production. And, a significant feature of the process in the present disclosure is that the metal droplets can overcome the disadvantage of big density and low viscosity, and achieve the unique fibrous splitting mode of aqueous solution and organic solution. Compared with the particle size of the current molten droplet metal powder, the present disclosure can be expected to make leaping progress in the ultrafine refinement of the powder and the control of the particle size distribution.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

Figure 1:
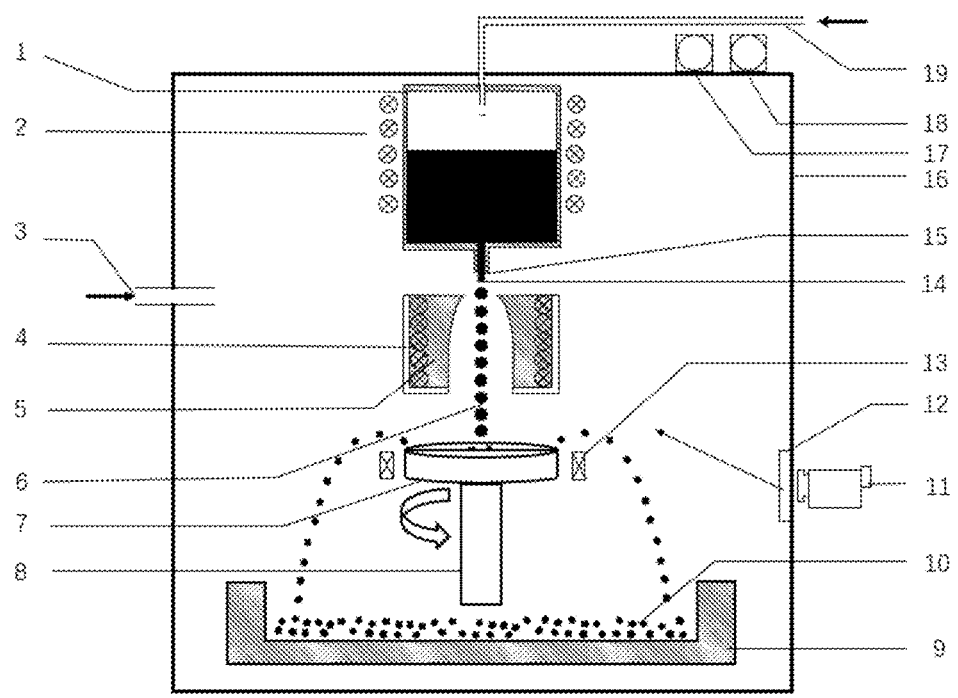
FIG. 1 is a structural schematic diagram of the apparatus in the present disclosure.

Wherein, in the figures: 1. crucible; 2. induction heater; 3. cavity air inlet pipe; 4. induction coil; 5. concentrator; 6. uniform droplet; 7. turnplate; 8. motor; 9. collection tray; 10. metal powder; 11. high-speed camera; 12. observation window; 13. induction heating coil; 14. capillary jet flow; 15. nozzle; 16. housing; 17. diffusion pump; 18. mechanical pump; 19. crucible air inlet pipe; 20. receiving portion; 21. support portion; 22. atomization plane; 23. air hole.

DESCRIPTION OF THE EMBODIMENTS

It should be noted that, in the case of no conflicts, the embodiments and the features in the embodiments of the present disclosure can be combined mutually. The present disclosure will be described in detail below with reference to the accompanying drawings and the embodiments.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present invention and its application or use. Based on the embodiments of the present disclosure, all the other embodiments obtained by those of ordinary skill in the art without inventive effort are within the protection scope of the present disclosure.

It should be noted that the terms used herein are only intended to describe specific embodiments and are not intended to limit the exemplary embodiments of the present disclosure. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present disclosure. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present disclosure, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present disclosure and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present disclosure: orientation words "inner and outer" refer to the inside and outside relative to the contour of each component.

For ease of description, spatially relative terms such as "on", "over", "on the upper surface", and "above", can be used here to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotating 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present disclosure.

As shown in FIG. 1, the present disclosure provided an apparatus for efficiently preparing spherical metal powder for 3D printing employing splitting into fibers, including a housing 16, a crucible 1 and a powder collection area arranged in the housing 16. The powder collection area is arranged at the bottom of the housing 16 and the crucible 1 is arranged above the powder collection area. The housing 16 is provided with a crucible air inlet pipe 19 extending into the crucible 1, and is also provided with a diffusion pump 18 and a mechanical pump 17 connected to the crucible 1, and is also provided with a cavity air inlet pipe 3.

The crucible 1 is provided with a thermocouple inside and an induction heater 2 outside. The crucible 1 is provided at the bottom with a nozzle 15 with small holes. The aperture of the small hole of the nozzle ranges from 0.02 mm to 2.0 mm.

A concentrator 5 is arranged below the nozzle 15, and an induction coil 4 is arranged outside the concentrator 5.

The powder collection area includes a collection tray 9 arranged at the bottom of the housing, and a turnplate 7 arranged above the collection tray 9 and connected with a motor 8 for atomizing metal droplets.

Figure 2:
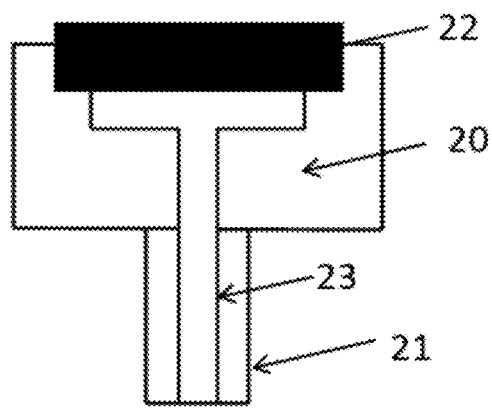
FIG. 2 is a structural schematic diagram of the turnplate in the present disclosure.

As shown in FIG. 2, the turnplate 7 includes a base, an atomization plane 22 and an air hole 23.

The base has a structure of a "T-shaped" longitudinal section constituted of an upper receiving portion 20 and a lower support portion 21. The upper surface of the receiving portion 20 is provided with a circular groove with a certain radius coaxial with the center of the receiving portion 20. The base is made of a material with a thermal conductivity less than 20 W/m/k.

The atomization plane 22 is a disc structure, matching the circular groove of the receiving portion and in interference fitting with the circular groove. The atomization plane 22 is made of a material having a wetting angle less than 90° with respect to the uniform droplet 6.

The air hole 23 is arranged passing through the receiving portion 20 and the support portion 21. The upper end face of the air hole 23 is in contact with the lower end face of the atomization plane 22, and the lower end of the air hole 23 is communicated with the outside world.

An induction heating coil 13 is also arranged outside the turnplate 7. The turnplate 7 is made of a stainless steel disc inlaid with copper, and a rotational speed of the turnplate 7 is 10000 rpm to 50000 rpm. A heating thickness of the induction heating coil 13 ranges from 5 mm to 20 mm, and the induction heating coil is connected with a frequency converter and a stabilized voltage supply arranged outside the housing 16, and a voltage control range of the stabilized voltage supply is 0 v to 50 V.

A center of the turnplate 7 and the nozzle 15 at the bottom of the crucible 1 are coaxial, thus the droplets can fall evenly on the center of the turnplate, which is conducive to spreading.

The housing 16 in the same horizontal plane with the turnplate 7 is provided with an observation window 12 for photographing by a high-speed camera 11.

The volume of the housing 16 should be large enough for flight and landing range of the droplets after centrifugation and being broken, so as to ensure that the droplets will not solidify on the inner wall of the housing 16. The area of the collection tray 9 should be large enough to collect metal powder 10.

During operating, the housing 16 and the crucible 1 are vacuumized by using the mechanical pump 18 and the diffusion pump 17. The crucible 1 is provided at the bottom with a nozzle 15 connected with the housing 16. The induction heater 2 is used to heat the materials to-be-prepared in the crucible 1. A high-purity inert shielding gas, such as helium and argon gas, is introduced into the crucible 1 and the housing 16 through the crucible air inlet pipe 19 and the cavity air inlet pipe 3, to maintain a certain positive pressure difference between the crucible 1 and the housing 16. Under the action of the pressure difference, the capillary jet flow 14 can be generated in the nozzle 15. The induction coil 4 and the concentrator 5 are installed below the nozzle 15. When a modulating alternating current signal is applied on the induction coil 4, the induction coil 4 will apply electromagnetic force on the capillary jet flow 14 and make it break into uniform droplets 6. The droplets 6 freely land on the turnplate 7 rotating at a high speed, and the droplets 6 will spread on the turnplate in a fibrous shape due to the effect of centrifugal force, and then split into tiny droplets to fly out. The tiny droplets fall freely and solidify into the metal powder 10, and the metal powder is collected by collection tray 9.

The present disclosure also discloses a method for efficiently preparing spherical metal powder for 3D printing employing splitting into fibers, including the following steps:

S1. charging: sealing the housing 16 after charging the metal material to-be-melted into the crucible 1 arranged in the upper portion of the housing 16; the crucible 16 is provided at the bottom with the nozzle 16; and a wetting angle between a material of the crucible 1 and a molten metal in the crucible 1 is greater than 90°.

S2. vacuumizing: vacuumizing the crucible 1 and the housing 16 by using the mechanical pump 18 and the diffusion pump 17, and filling the crucible 1 and the housing 16 with a high-purity inert shielding gas, to make the pressure inside the housing 16 reach a preset value; wherein the high-purity inert shielding gas is helium or argon gas, making the pressure in the housing 16 reach 0.1 MPa.

S3. heating the crucible: melting the metal material in the crucible 1 by using the induction heater 2, monitoring the temperature inside the crucible 1 in real time by the thermocouple arranged in the crucible 1, and maintaining the temperature after the metal material is completely melted.

S4. induction heating: enabling the turnplate 7 to rotate at a high preset speed by using the motor 8, and heating a surface of the turnplate 7 rotating at the high speed to a temperature higher than a melting point of the metal by using the induction heating coil 13; wherein the turnplate is a stainless steel disc inlaid with copper, and the rotational speed of the turnplate ranges from 10000 rpm to 50000 rpm;

and a heater voltage range of the induction heating coil is 0 to 50V, and an induction heating time ranges from 5 to 15 minutes.

S5. making the powder: applying a modulating alternating current signal to the induction coil 4 outside the concentrator 5 coaxial with the nozzle 15 arranged in the middle of the housing 16. A current effective value of the modulating alternating current signal is 30 A to 60 A, a carrier frequency is 3 MHz to 30 Mhz, a modulation frequency is 200 Hz to 20000 Hz, and a duty ratio is 50%.

A high-purity inert shielding gas is introduced into the crucible 1 by the crucible air inlet pipe 19 arranged on the housing 16 and extending into the crucible 1, to form a positive pressure difference between the crucible 1 and the housing 16. The molten metal flows out from the nozzle 15 to form a capillary jet flow 14 under the action of the pressure difference, and the capillary jet flow 14 breaks into uniform droplets 6 under the electromagnetic force applied by the induction coil 4. The uniform droplets 6 freely land on the center of the turnplate 7 rotating at a high speed and spread on the turnplate 7 in a fibrous shape under the action of centrifugal force. The turnplate 7 is enabled to rotate at a preset high speed by the motor 8, then the surface of the turnplate 7 rotating at the high speed is heated to a temperature higher than the melting point of the metal material by the induction heating coil 13. Under the action of centrifugal force, the uniform droplets 6 radially and fibrously split to form tiny droplets, and the tiny droplets freely land and solidify to from metal powder 10.

S6. powder collection: collecting the metal powder 10 by the collection tray 9 arranged at the bottom of the housing 16.

Embodiment 1

A batch preparation of Sn-0.3Ag-0.7Cu spherical powder is as follows:

The raw material of Sn-0.3Ag-0.7Cu is broken into small pieces and charged to the crucible 1 after ultrasonic cleaning. The aperture of the nozzle 15 is selected according to the demand. For example, when preparing particles with a diameter of 25 μm to 50 μm, a nozzle with an aperture of 0.02 mm to 1.0 mm is selected; and when preparing particles with a diameter of 50 μm to 100 μm, a nozzle with an aperture of 1.0 mm to 2.0 mm is selected. The adding amount of the raw material of Sn-0.3Ag-0.7Cu is up to ½ to ¾ of the capacity of the crucible 1, as shown in FIG. 1.

The housing 16 and the crucible 1 are pumped to a low vacuum below 5 Pa by using the mechanical pump 18, and then the housing 16 and the crucible 1 are pumped to a high vacuum of 0.001 Pa by using the diffusion pump 17. A high-purity inert shielding gas of argon gas is introduced into the housing and the crucible through the crucible air inlet pipe 19 and the cavity air inlet pipe 3 to make the pressure inside the housing 16 and crucible 1 reach 0.1 MPa.

The crucible 1 is heated by the induction heater 2 to 260° C. to melt the metal material in the crucible 1, and the temperature is kept at 260° C. for 20 minutes.

A high-purity inert shielding gas of argon gas is introduced into the crucible 1 by using the crucible air inlet pipe 19, to form a stable pressure difference between the crucible 1 and the housing 16. The molten metal flows out from the nozzle 15 to form a capillary jet flow 14 under the action of the pressure difference. At the same time, a modulating alternating current signal is applied on the induction coil 4, which generates a changing magnetic field around the induction coil 4. The magnetic field is concentrated on the capillary jet flow 14 through the concentrator 5, to make the capillary jet flow 14 generate a eddy current. Under the interaction of the eddy current and the magnetic field, the capillary jet flow 14 breaks into uniform droplets 6. The droplets 6 freely land on the center of the turnplate 7 rotating at a high speed. Due to the action of centrifugal force, the droplets 6 are broken into tiny droplets one-by-one, and the tiny droplets solidify into the metal powder 10 during freely falling.

Through the observation window 12, the falling process of the droplets 6 and the process that the droplets 6 fall to the turnplate 7 and break into tiny droplets due to centrifugal force can be recorded by the high-speed camera 11.

After the collection is completed, stop applying the modulating alternating current signal on the induction coil 4, that is, stop spraying the droplets; stop the motor 8 rotating at a high speed, thereby the turnplate 7 stops rotating; close the induction heater 2, and the metal powder 10 is taken out from the collection tray 9 after the temperature deceased to room temperature. At last, the cavity air inlet pipe 3 and the crucible air inlet pipe 19 are closed, and the crucible 1 and the housing 16 are pumped to a low vacuum below 5 Pa by using the mechanical pump 18, so as to make the apparatus in a vacuum state when out of service.

Figure 3:
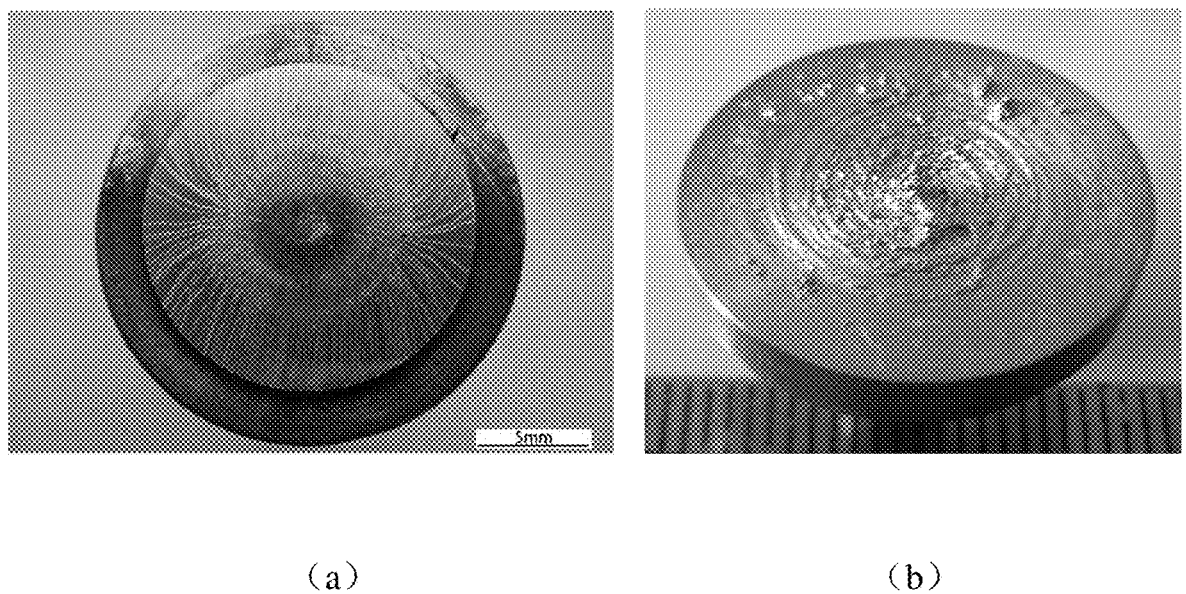
FIG. 3 is a comparison diagram between a surface of the turnplate in the present disclosure after an experiment and that of an original turnplate after an experiment, wherein FIG. 3 panel (a) is a surface of the turnplate in the fibrous splitting mode, and FIG. 3 panel (b) is a surface of the turnplate in the prior art.

As shown in FIG. 3, panel (b) is an atomization plate obtained after atomization in the prior art. Because the wettability between the materials of the atomization plate and the prepared metal powder is too small and the temperature of the turnplate during the atomization process is too low, the liquid splits in a film shape and there's a thick solidified liquid film on the atomization surface. The surface of the liquid film is too rough to atomize the subsequent metal droplets well, thereby seriously affecting the atomization effect and atomization efficiency. FIG. 3 panel (a) is an atomization surface obtained by using the method of the present disclosure. It can be seen that the atomization mode is transformed into an obvious fibrous split mode, which greatly improves the fineness and production efficiency of the metal powder.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

The invention claimed is:

1. An apparatus for preparing spherical metal powder, comprising:
   a housing that houses a crucible and a powder collection area, wherein the powder collection area is arranged at a bottom of the housing and the crucible is arranged above the powder collection area in the housing;
   a crucible air inlet pipe extending through a wall of the housing into the crucible,
   a diffusion pump and a mechanical pump connected to the crucible through the wall of the housing and
   an air inlet pipe extending through the wall of the housing, wherein the crucible is provided with a thermocouple disposed inside the crucible, an induction heater disposed about the crucible, and a nozzle disposed at a bottom of the crucible, wherein a concentrator is coaxially arranged below the nozzle, and the concentrator is a hollow cylinder having an induction coil disposed about a circumference of the cylinder wherein the powder collection area comprises a collection tray and a turnplate arranged above the collection tray and connected with a motor for atomizing metal droplets, wherein the turnplate comprises:

a base having a structure of a "T-shaped" longitudinal section with an upper receiving portion and a lower support portion, the upper surface of the receiving portion is provided with a circular groove coaxial with a center of the receiving portion;

an atomization plane having a disc structure disposed in the circular groove in an interference fit, an air passage extending through the receiving portion and the support portion so that a lower end face of the atomization plane is in fluid communication with air outside the housing; and an induction heating coil disposed about the turnplate, wherein a center of the turnplate and the nozzle at the bottom of the crucible are coaxially arranged so that, during operation, a molten metal flowing out from the nozzle is broken into uniform droplets under the action of electromagnetic force applied by the induction coil, the uniform droplets land on the center of the turnplate rotating at a high speed and are spun out from the turnplate under the action of a centrifugal force and form spherical metal droplets that land in the collection tray.

2. The apparatus to claim 1, wherein the nozzle has an orifice having an aperture size ranging from 0.02 mm to 2.0 mm.

3. The apparatus according to claim 1, wherein a wetting angle between a material of the crucible and a molten metal in the crucible is greater than 90°.

4. The apparatus according to claim 1, wherein, during operation, a rotational speed of the turnplate ranges from 10000 rpm to 50000 rpm.

5. The apparatus according to claim 1, wherein a heating thickness of the induction heating coil ranges from 5 mm to 20 mm, and the induction heating coil is connected to a frequency converter and a stabilized voltage supply arranged outside the housing.

6. The apparatus according to claim 1, wherein the housing is provided with an observation window.

7. The method for preparing spherical metal powder using the apparatus according to claim 1, comprising the following steps:

S1. sealing the housing after charging a metal material to-be-melted into the crucible arranged in an upper portion of the housing, wherein the crucible is provided at the bottom with the nozzle;

S2. vacuuming the crucible and the housing by using the mechanical pump and the diffusion pump, and filling the crucible and the housing with an inert shielding gas to pressurize the housing to a preset value;

S3. melting the metal material in the crucible to form a molten metal by heating the crucible using the induction heater, monitoring a temperature inside the crucible in real time by the thermocouple arranged in the crucible, and maintaining the temperature after the metal material is completely melted;

S4. driving the turnplate to rotate at a preset speed by using the motor, and heating a surface of the turnplate rotating at the high speed to a temperature higher than a melting point of the metal material by using the induction heating coil;

S5. applying a modulating alternating current signal to the induction coil outside the concentrator, introducing the inert shielding gas into the crucible through the crucible air inlet pipe to form a positive pressure difference between the crucible and the housing to cause the molten metal flowing out from the nozzle to form a capillary jet flow under the action of the pressure difference, and breaking the capillary jet flow into droplets under the action of electromagnetic force applied by the induction coil, wherein the droplets land on the center of the turnplate rotating at a high speed, and under the action of the centrifugal force, the droplets radially and fibrously split to form micro droplets that solidify to from spherical metal powder; and S6. collecting the spherical metal powder in the collection tray arranged at the bottom of the housing.

8. The method according to claim 7, wherein a current effective value of the modulating alternating current signal is 30 A to 60 A, a carrier frequency is 3 MHz to 30 Mhz, a modulation frequency is 200 Hz to 20000 Hz, and a duty ratio is 50%.

9. The method according to claim 7, wherein a pressure in the housing after vacuuming reaches 0.1 MPa.

10. The method according to claim 7, wherein S3 further comprises holding the molten metal in the crucible for 15 to 20 minutes after the metal material is completely melted.

11. The method according to claim 7, wherein, in step S5, the pressure difference between the crucible and the housing is 0 to 200 kPa.

* * * * *